Oct. 27, 1970          R. L. LIPPINCOTT          3,536,535
ELECTRIC POWER SOURCE WITH MOVABLE ANODE MEANS
Filed Nov. 25, 1969                         3 Sheets-Sheet 3

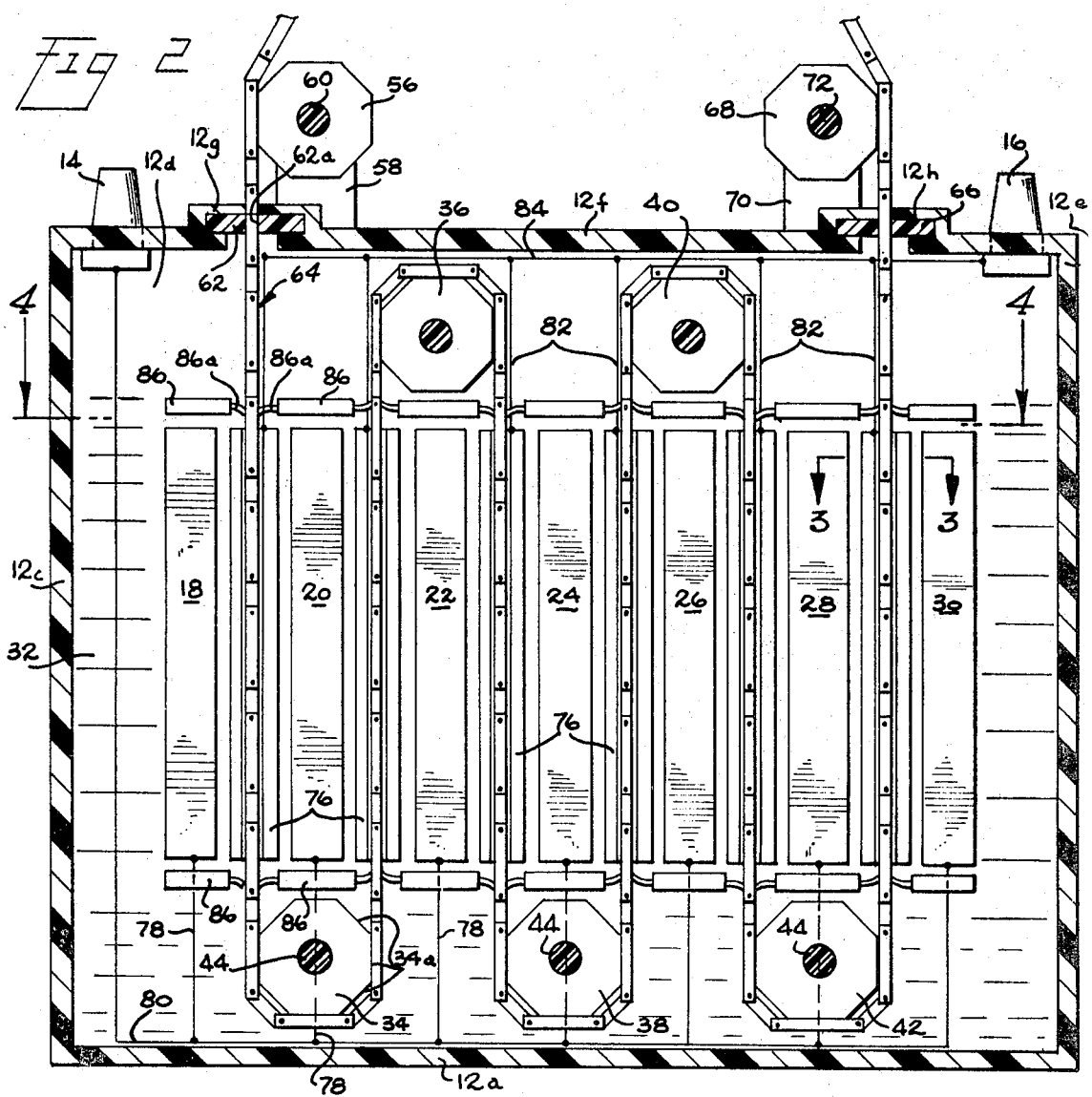

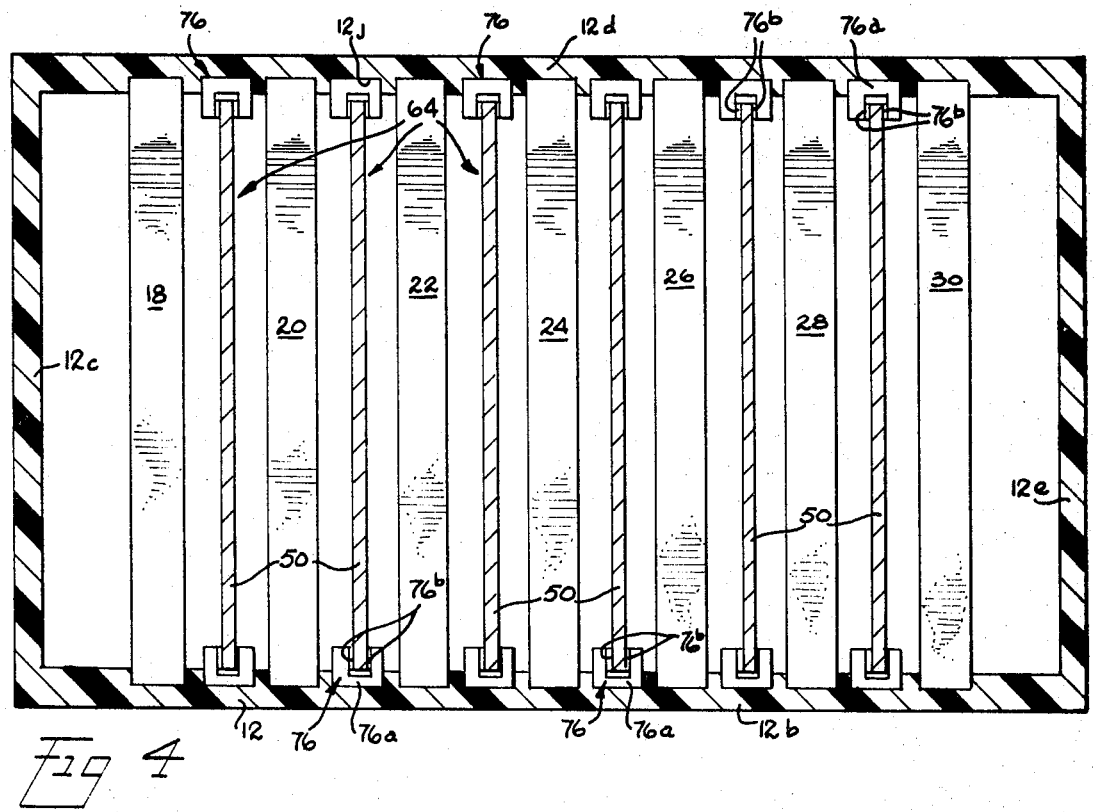
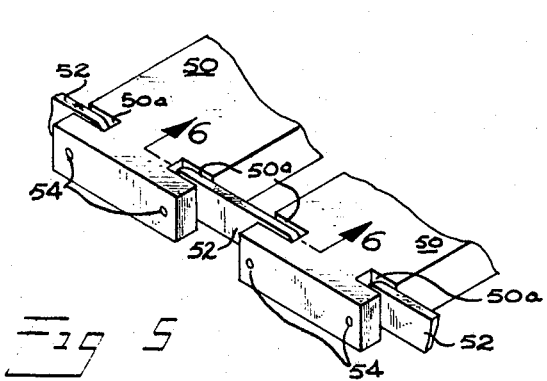
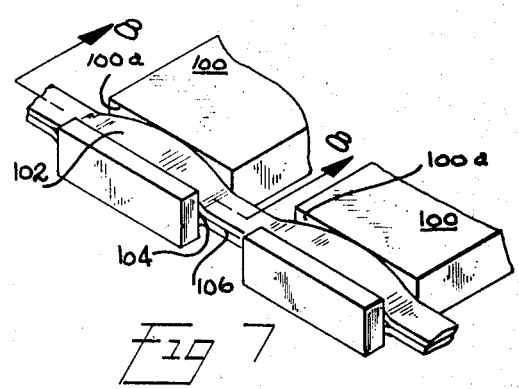
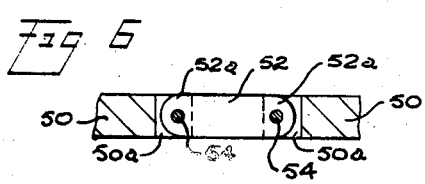
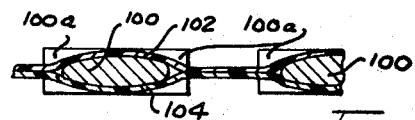
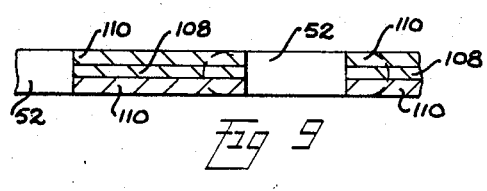
INVENTOR.
RICHARD L. LIPPINCOTT
BY
ATTORNEY.

INVENTOR.
RICHARD L. LIPPINCOTT
BY Lewis M. Dalgarn
ATTORNEY.

United States Patent Office 3,536,535
Patented Oct. 27, 1970

3,536,535
ELECTRIC POWER SOURCE WITH
MOVABLE ANODE MEANS
Richard L. Lippincott, Santa Ana, Calif., assignor to Whittaker Corporation, Los Angeles, Calif., a corporation of California
Continuation-in-part of application Ser. No. 726,095, May 2, 1968. This application Nov. 25, 1969, Ser. No. 870,567
Int. Cl. H01m 27/00, 35/00
U.S. Cl. 136—86     9 Claims

ABSTRACT OF THE DISCLOSURE

An improved electric power source, such as zinc-air storage batteries or the like, has an excess of consumable anodic material in the form of individual flat rectangular metal bars attached parallel to one another by an insulating material to form a flexible chain or track movable in a continuous path between adjacent cathode plate structures. Elongated strip conductors disposed along the path contact the edges of the individual bars as they move between adjacent pairs of cathode plate structures for multicell operation, and flexible wipers disposed at intervals along the path bear against the opposing bar surfaces to scrape or brush foreign material and reactive product deposits therefrom as the bars move past to maintain the anode surfaces free of harmful deposits that prevent or inhibit further operation.

REFERENCE TO RELATED APPLICATION

This application is a continuation-in-part of applicant's copending application Ser. No. 726,095 filed May 2, 1968, now abandoned.

BACKGROUND OF THE INVENTION

Field of the invention

This invention relates to electrochemical power sources, and more particularly, storage batteries having an excess supply of anode material movable into and through the electrolyte relative to stationary gas cathode structures.

Description of the prior art

Substantial efforts have been made in recent years to provide electrochemical power supplies and in particular storage batteries having high load capacities and long operating life with high energy density per unit weight. This had led to the development of zinc-air and similar type batteries that employ gas operated cathodes having virtually inexhaustible capacity. Typically, such cathode have an electrically conductive porous material, such as carbon, permeable to the passage of the air or other gas, but substantially impermeable to the passage of the aqueous electrolyte in which the cathode is immersed. Since the air electrodes of such batteries have practically inexhaustible capacity as long as sufficient gas is supplied, the operating life of these batteries depends primarily on the supply of metallic anode material.

However, operation of such batteries cannot be indefinitely extended merely by increasing the amount of anodic material in a conventional battery plate design since other difficulties arise with prolonged usage. For example, in the zinc-air batteries the zinc dissolved in the electrolyte crystalizes on the anode surfaces to form dendrites or whiskers that gradually grow outward toward the cathode until the plates are short circuited.

Also, with the development of such batteries attempts have been made to employ such low cost anode materials as iron and aluminum. Aluminum is not only relatively inexpensive, but has a higher energy potential than zinc. However, contaminants and products of the eletcrolytic reaction, such as oxides and carbonates of these metals, form surface deposits that inhibit continued chemical reaction at the anode surfaces.

Accordingly, although such batteries have cathodes with virtually inexhaustible capacity, the conventional anode plate structures required frequent removal for surface cleaning or replacement. Although some of these difficulties are alleviated by using special porous anode materials to increase the effective anode area, costly fabrication techniques are required.

In other cases, batteries have been developed with special anodes in the form of elongated tapes so that additional anode material can be fed into the cell at a controlled speed to replenish that being consumed. However, since the tape had to be flexible, the anode materials had to be very thin and in a form neither hard nor brittle to prevent the tape from cracking. This limited the available anodic material in a given length of tape. Also, with the battery terminal connected to the end of the tape, current had to flow through its entire length resulting in a relatively high internal resistance that produced undesirable power losses and voltage drops under heavy load condition, and such tape batteries were incapable of multicell operation.

SUMMARY OF THE INVENTION

Electrochemical cells or batteries in accordance with this invention employ cathode structures of virtually inexhaustible capacity, such as air cathodes and the like, along with a unique anode structure for supplying anodic material in a continuous path between adjacent cathode plate structures and having wiper units located along the path for cleaning harmful deposits from the anode surfaces.

In particular, zinc-air batteries and the like constructed in accordance with the invention have a plurality of cathode structures with porous plates permeable to the passage of a gas, but impermeable to the aqueous electrolyte. These plates are aligned parallel to one another within an electrolyte filled housing with the electrolyte covering the outer surface and the gas against the inner surface. The anode structure has individual flat solid bars of the desired anode material, such as zinc, each having a substantial thickness, joined parallel to one another with an insulating connection to form an elongated track or chain that moves in a continuous path between adjacent cathode plate structures. Excess anodic material for replenishing the supply in the battery is wound on a storage reel and unrolled to move in a continuous upward and then downward path past successive cathode plate structures the direction being reversed between adjacent pairs of cathode plate structures, until emerging from the housing to be stored on a take-up reel. The take-up and storage reels can be rotated at controlled rates in accordance with the load on the battery to replenish the anodic material at approximately the rate that it is being consumed by the electrochemical reaction.

The edges of the anode bars as they move past the cathode plate structures are held in electrical contact with individual conductive strips to provide a series of individual battery cells which may be connected in parallel or series. Wiper means containing a flexible material held in contact with the opposite surfaces of the individual anodic bars are spaced at intervals along the path to remove deposits of harmful contaminants and chemical reaction productions from the bars after each upward or downward pass between adjacent cathode plate structures. In the case of zinc-air batteries, the wipers are particularly useful in removing the zinc dendrites or whiskers that would eventually cause short circuiting between cathode and anode.

Thus, batteries, in occardance with the invention are capable of multicell operation over extended periods by providing a continuous supply of excess anodic material to replenish that being consumed, while at the same time providing automatic cleaning of harmful deposits from the anode surfaces. In addition, the anodes are made of flat metal bars that may easily and inexpensively be formed by molding or cutting from metal plates.

DESCRIPTION OF THE DRAWINGS

FIG. 1 is a side elevational view of a source of electric power according to the present invention;

FIG. 2 is a full side sectional view showing one preferred form of a source of electric power in accordance with the invention as illustrated in FIG. 1;

FIG. 3 is a fragmentary top sectional view taken substantially along line 3—3 of FIG. 2;

FIG. 4 is a full top sectional view taken substantially along the line 4—4 of FIG. 2;

FIG. 5 is a fragmentary perspective view of a first embodiment of the anode structure for use in batteries in acordance with the invention;

FIG. 6 is a fragmentary sectional view taken substantially along the line 6—6 of FIG. 5;

FIG. 7 is a fragmentary perspective view of a second embodiment of the anode structure used in accordance with the present invention;

FIG. 8 is a side sectional view taken substantially along line 8—8 of FIG. 7;

FIG. 9 is a fragmentary side sectional view showing a further alternative form for the anode porous structure that may be employed for the anode structures in FIGS. 5 and 7;

DESCRIPTION OF THE INVENTION

Figure 10:
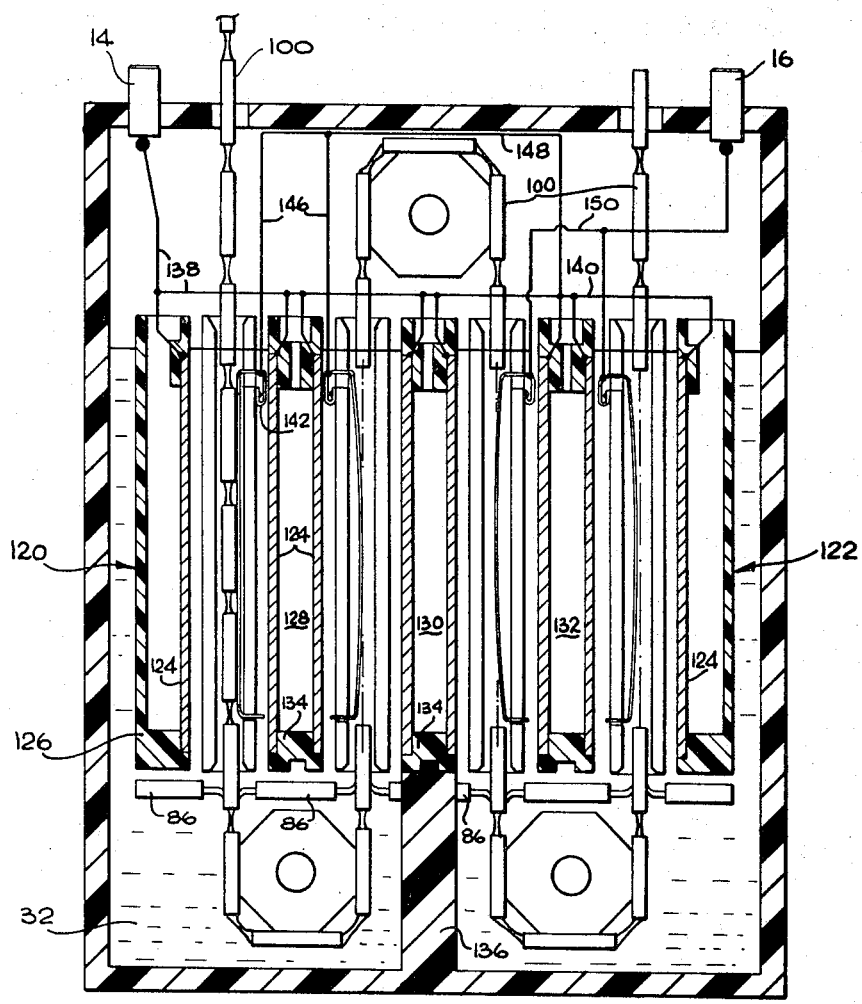
FIG. 10 is a full side sectional view of an alternative embodiment of the invention where the battery is capable of multicell operation with the cells being coupled in series.

Refering now to FIG. 1 of the drawings which illustrates a battery or source of electric power 10 made in accordance with the present invention, the chemical current generating process occurs within a housing or casing 12 formed with a bottom wall 12a, side walls 12b, 12c, 12d and 12e in addition to a top wall or cover 12f all formed of chemically inert material that houses the various reactive materials without reacting therewith. Electrical terminals 14 and 16 are mounted in the top wall or cover 12f of the housing for connecting the battery 10 external circuitry as will be apparent to those skilled in the art.

Referring now to FIG. 2 of the drawings which illustrates the generating means within the housing 12, a plurality of cathode plate structures 18, 20, 22, 24, 26, 28 and 30 are fixedly mounted within the housing 12 in spaced apart substantially parallel relation. Although the subject invention is not limited to a specific combination of chemical ingredients or certain types of chemical reactions, the preferred embodiment of FIG. 2 is employed with particular advantage in the construction and operation of the gas cathode type of batteries, such as those commonly referred to as zinc-air or zinc-oxygen batteries. These cathode structures which are illustrated in generalized form in FIG. 2, may be of the type commonly referred to as "air cathodes" usually consisting of carbon and a catalyst compressed into a porous block form, from which the individual plate structures may be formed. Typically, these plate cathode structures, such as 22, each have two flat plates of the pressed carbon material mounted parallel to one another in a frame to define an open space between the plates for the circulation of the air or other gases. The gas is introduced between the porous plates which are permeable to the passage of gases, but impermeable to aqueous solutions and passes through to the outer surface of the plates typically to be reduced in either an acid or a base electrolytic solution to release hydroxyl ions at the opposite sides of each cathode structure. Various other cathodic materials may also be employed, such as chlorine gas cathodes and the like, in accordance with the present invention.

The cathode plate structures, 18, 20, etc., are firmly mounted within the housing 12 to extend the entire width thereof. An appropriate catalytic solution or electrolyte 32 fills a substantial portion of the housing interior to maintain the active surfaces of the cathodes completely immersed to assist in performing the electrical generating operation. Of course, where gas cathode structures are employed, the gas is introduced into the interior of the cathode plate structures 18, 22, etc., through an appropriate manifolding or a gas inlet arrangement.

In this embodiment, five idler wheels 34, 36, 38, 40 and 42 are each mounted within the housing 12 on a pin or shaft 44 that has its ends journaled for rotation in the opposite housing side walls 12b and 12d. As will hereinafter become more apparent, these idler reels are constructed in a special manner to conform to the anode structure. In this case, each idler reel is formed with eight equal surfaces 34a spaced at equal angles about the axis of the shaft 44. However, the particular configuration of such reels or other appropriate types of translating devices, may be selected in accordance with the particular construction of the anode structure to be hereinafter described.

As shown in FIG. 1 of the drawings, a storage reel 46 external of the housing 12 has wound thereon an excess amount of anodic material having far larger size and active surface dimensions than the cathode plate structures 18, 20, etc., so that additional anodic material may be supplied to replenish that being consumed by the electrochemical processes within the battery thus prolonging battery life.

Referring now to FIG. 5 of the drawings which illustrates one preferred for of the anode structure, flat elongated bars 50 of the anodic material, such as solid zinc, each have a pair of slots 50a formed slightly inward from the opposite edges. The bars 50 with the slots may be formed in a single compression casting operation, or cut from sheets. Insulative connective links 52, which may be formed of a suitable inert plastic, join adjacent bars 50 to one another with holes extending through rounded opposite ends 52a that receive mounting pins 54 which are inserted through holes provided in the ends of the bars on opposite sides of the slots 50a. This provides a flexible chain of solid bars 50 that can be moved in a continuous path around the idler wheels and wound on reels for compact storage.

Referring again to FIG. 1 of the drawings in conjunction with FIG. 2, a lead-in idler wheel 56 is rotatably mounted in a bracket 58 on a shaft 60. The lead-in idler wheel 56 preferably has the same octagonal configuration of the idler wheels 34 that are mounted within the housing 12. The additional anodic material from the storage reel 46 is fed into the housing 12 over the lead-in idler wheel 56 through an elongated rectangular opening or slot 12g in the top, and a flexible cover or partition wall 62 may be provided for preventing accidental ingress of foreign materials or the outflow of the liquid electrolyte or catalyst. Partition wall 62 can be formed of a suitably flexible inert material with the edges held within elongated mounting slots formed on top wall 12f with an elongated central slot 62a corresponding to the cross section of the anode bars passing therethrough.

The chain of anodic material bars 50 is threaded down between the first adjacent pair of cathode plate structures 18 and 20 to pass around the idler wheel 34 and then upwardly between the next adjacent pair of cathode plate structures 20 and 22, and so on, so that it is threaded in a continuous path to pass between each adjacent pair of cathode plate structures in the series. After passing upward between the last pair of structures 28 and 30, the chain like anode structures emerges from the housing through an elongated exit opening or slot 12h with a flexible partition wall 66 similar to the partition wall 62, but preferably having a smaller central opening therein to accommodate the reduced cross sectional area of the anode bars 50 from which much of the anodic material has been consumed in the chemical reactions. A lead-out idler wheel 68 is rotatably mounted in the bracket 70 on its shaft 72 on the top wall 12f of the housing to guide the used anodic material emerging from the housing 12 for winding on a take-up reel 74.

Conductor guide slots 76 are disposed on the opposite walls 12b and 12d within the housing between each adjacent pair of cathode plate structures 18, 20, etc., to engage the opposite ends of the flattened bars 50 of the anodic material. These guide slots 76 maintain the bars in proper alignment during passage between the anode plate structures 18, 20, etc., while also providing electrical contact for conducting electron flow from the individual bars. As shown in FIG. 3, each guide conductor 76 consists of an elongated generally U-shaped channel member 76a that may be formed integrally with the side wall, or as illustrated, formed separately to be mounted within an appropriate elongated slot 12j formed in the respective side walls. The channel member 76a is made of an insulating material such as plastic, or the like, that is inert to the electrolyte 32. Elongated conductor strips 76b are mounted within the channel member 76a to extend substantially the entire length of the slots 12j to contact the edges of the anode 50 within the slot. These conductor strips 76b may be formed of any conductive material resistant to corrosion or chemical attack by the electrolyte. For example, the strips may be made of copper-nickel alloy for operation in a zinc-air battery employing a basic electrolyte such as potassium hydroxide, or nickel-silver alloy plated metal strip for acidic electrolytes. To facilitate the entrance of the anode bars, the conductor strip 76b should be tapered at the ends, and may preferably have a spring-like structure as hereinafter described with the embodiment of FIGS. 10 and 11. In this manner the anode bars 50, in a particular guide slot between each adjacent pair of cathode plate structures, are electrically connected together to operate as a separate anode plate structure insulated from the rest of the bars in the chain to permit multicell operation. Also, with this arrangement the internal resistance of battery is low since current flow is collected at the edges of each anode bar 50 rather than, as in the prior art, movable anode tape batteries having to be conducted through the entire length of the elongated anode structure.

As shown schematically in FIG. 2, the battery cells are connected for parallel operation with connecting leads 78 and 80 coupling all of the cathode plate structures 18, 20, 22, 24, 26, 28 and 30 to the negative battery terminal 16. Similarly, connecting leads 82 and 84 connect all of the conductor strips 76b to the positive battery terminal 16. During operation, the terminals 14 and 16 may be connected to supply electrical power generated by the chemical reaction between the anode bars 50 and the cathode plate structures 18, 20, etc., in the electrolyte or catalyst 32 to an external load circuit.

Anode wiper units 86 are mounted within the housing with flexible wiper extensions 86a for engaging the opposite surfaces of the anode bars 50 as they are moved from between one pair of cathode plate structures to the next adjacent pair. The flexible wiper extensions 86a may consist of any suitable chemically inert material which, for example, may be formed similar to an ordinary automobile windshield wiper. As each bar passes the wiper units 86, undesirable contaminants and chemical reaction products that accumulate on the anode surfaces are scrapped or brushed away leaving a clean surface of anoidc material to support further reaction.

The particular material and configuration of the flexible wiper extension 86a depends upon the type of battery employed since the reactive materials used determine the nature of the deposits to be removed from the anodic surfaces. In zinc-air batteries, for example, zinc from the anodes is dissolved in the electrolyte to be deposited in crystallized form as dendrites or whiskers that extend outwardly from the anode surface. Unless removed, these dendrites eventually would grow to reach the surface of the anode plate structure to short circuit the battery plates. Since these zinc whiskers or dendrites are relatively fragile, they can be easily broken away and removed by almost any sort of flexible wiper material. On the other hand, air cathode batteries employing such materials as aluminum and iron are subject to the build up of oxide deposits that require more of the scrapping action to remove from the surface so that stiffer wiper materials must be used.

Deposits removed from the surfaces of the bars 50 by the action of the flexible wiper extensions 86a fall downwards through the electrolyte to be accumulated in the empty reservoir or well space at the bottom of the housing 12 on the bottom wall 12a. This space may be enlarged or deepened as necessary to give additional capacity so that the deposits removed can accumulate without interfering with the operation of the generating system.

Referring now to FIGS. 7 and 8 which illustrate an alternative form of the anode structure, the anode bars are formed with circumferential grooves 100a near the opposite edges to receive flexible elongated plastic straps 102 and 104 fit on opposite sides. The elongated straps 102 and 104 are joined together at equal intervals along their lengths at the points 106 between adjacent bars 100 to hold them apart. This arrangement provides a very flexible anode structure that holds the bars 100 in spaced apart parallel relation insulated from one another.

Referring now to FIG. 9, instead of solid bars of anodic material a laminated structure may be employed in which an anodic material 110 is plated or otherwise applied to opposite sides of a backing material 108, such as a plastic insert. Such structure may be desirable for certain anodic materials that are too brittle or soft to be formed in single homogenous bars with the edge configurations necessary for joining the adjacent bars together.

Figure 11:
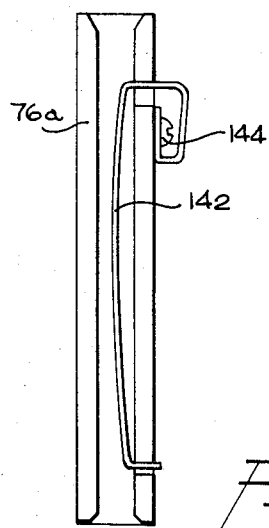
FIG. 11 is a fragmentary side elevational view showing a preferred form for the conductive strip anode bar contact employed in the embodiment of FIG. 10.

Referring now to FIG. 10, an alternative form of a battery in accordance with the invention is shown wherein the inherent multicell capability is employed to provide a battery with separate connected cells for supplying higher voltages. In this figure, a typical gas cathode plate structure of the type contemplated for use in the invention is shown in full section. Cathode plate structures 120 and 122 at the opposite ends of the battery have a single rectangular piece 124 of the porous cathode material sealed in a box-shaped plastic mounting member 126 to form an open cavity for introducing of the air or other gas to the inner surface of the porous plate 124. The outer surface of the plate 124 is in contact with the aqueous electrolyte or catalytic solution 32 that fills the housing. On the other hand, intermediate cathode plate structures 128, 130 and 132 each have two porous cathode plates 124 sealed in a rectangular plastic mounting frame 134 to define a hollow cavity between them for introducing the air or other gas to the opposing inner surfaces. The aqueous electrolyte or catalytic solution 32 fills the housing to a level that completely immerses the outer surfaces of the porous cathode plates 124, but the plastic mounting frames 134 extend upwardly above the surface of the solution forming an enclosed rectangular passage for the air or other gas to flow freely into the interior of the cathode plate structures.

The center cathode plate structure 130 is attached at its bottom edge to upward extension 136 from the bottom wall of the housing that partitions the lower portion of the housing interior. The bottom and side edges of the cathode plate structure 130 are attached to the adjacent interior portions of the housing side walls and to the top of the upward extensions 136 to form a liquid seal preventing communication between the liquid electrolyte solution on either side. In this way, the battery housing is separated to form independent isolated cells that are connected in series to provide a high voltage output at the terminals 14 and 16.

For this series connection, as shown in FIG. 10, a connector lead 138 couples all of the air cathode plates 124 communicating with the electrolyte on the left-hand side of the partition 136 in parallel to the battery output terminal 14, and a connector lead 140 couples all of the air cathode plates 124 on the right-hand side in parallel. Conductor strips, as shown most clearly in FIG. 11 for contacting the opposite ends of the anode bars 100, consist of a bent metallic conductor strip 142 having one end attached with a screw 144 to one of the outer walls of the U-shaped channel member 76a. This end of the metallic strip 142 extends downward from the screw 144 to be bent backwards and upwards over the screw head, and is bent again to pass horizontally through a slot in the outer wall of the U-shaped channel 76a. The strip 142 is then bent downwards to extend along the channel with it being bent at its lower end to fit into a slot at the bottom of the channel. This gives a resilient spring effect that maintains the metallic conductor strip 142 in positive contact with the adjacent edges of the anode bars 100. Connector leads 146 couple the two conductive strips 142 on the left-hand side of the plate 130 in parallel to a lead 148 that is connected to the lead 140 for the cathode plates in the right-hand portion of the battery. Another lead 150 couples the conductive strips 142 on the right-hand side of the battery in parallel to the negative output terminal 16 of the battery. With this connection, two multiplate battery cells are connected in series to double the output voltage available across the battery output terminals 14 and 16. In this regard, it is noted that the cathode plates 124 on opposite sides of the central cathode plate structure 130 are electrically insulated from one another by the plastic holding frame 134 at the edges and the open gas filled space between them so that the plates 124 on opposite faces of the structure 130 operate in different ones of the two isolated cells.

Alternatively, as will be apparent to those skilled in the art, the housing 12 may simply be provided with separate partitioning walls extending across the interior to a point above the electrolyte level so that cathode plate structures of uniform construction can be located in each portion in a manner similar to conventional multicell battery construction. Also, the number of separate cells for series connection may be increased as desired to provide higher output voltages.

In the embodiment of FIG. 10, the wiper units 86 are shown located only below the cathode plate structures so that deposits removed from the anode surfaces do not fall between the active electrode surfaces where they might become wedged between the moving anode bars and the stationary elements of the system.

As should be apparent to those skilled in the art, additional electrolyte or catalytic agents may be included with a movable anode structure to be dissolved into the aqueous solution being employed to maintain its strength. Moreover, a motor circuit responsive to the load on the battery may be used to control the speed at which the storage and take-up reels 46 and 74 are driven in such a manner that additional anodic material is supplied at a rate comparable to that at which it is being consumed by the electrochemical reaction. Alternatively, the motor speed may simply be set at an average rate if the load demand over extended periods of operation remains relatively constant, and the motor used for moving the anode structure may be operated by power from the battery itself since only a very small amount of power would be required for accomplishing this task.

What is claimed is:
1. A source of electric power having opposite polarity electrodes immersed in an electrolytic solution, one electrode having an anodic material and the other a cathodic material, comprising:
   a plurality of stationary electrodes of one polarity having a substantially unlimited capacity mounted in spaced apart substantially parallel relationship;
   a movable electrode means of opposite polarity having individual bars of consumable electrode material and an insulative material attaching said bars in spaced apart parallel relationship and forming an elongated flexible chain;
   means for moving the bars of said movable electrode means in a continuous path between adjacent ones of said fixed electrodes; and
   a plurality of separate electrical contact means disposed along separate portions of said path between said stationary electrodes and maintaining common electrical contact with the sequence of bars in each said separate portion of said path.

2. The source of electric power of claim 1 wherein: said fixed electrodes are gas cathode plate structures having plates of porous conductive material permeable to gas but impermeable to the electrolyte solution; and said bars of said movable electrode means are elongated rectangular shaped bars of an anodic material.

3. The source of electric power of claim 2 wherein: said gas cathode plate structure includes means for supplying oxygen to the surface of said plates of porous material opposite said electrolyte; and said anodic material of said bars is solid zinc.

4. The source of electric power of claim 1 further comprising: flexible wiper means disposed at fixed locations along said path for removing deposits from the opposite surfaces of the bars of said moving electrode.

5. A battery of the type having anodic and cathodic electrodes immersed in an electrolyte, comprising:
   stationary cathode means providing a plurality of cathodic surfaces immersed in said electrolyte solution;
   a movable anode means including a plurality of individual anodic bars and insulative connecting means flexibly attaching said bars insulated from one another in spaced apart parallel relationship and forming an elongated flexible chain;
   separate electrical contact means adjacent each cathodic surface slidably receiving said bars and positioning them parallel to said cathodic surfaces, each of said contact means including a conductive element and providing common electrical contact between each of a plurality of said bars in sequence in said chain adjacent each of said cathodic surfaces; and
   translating means for moving said chain in a predetermined path through successive ones of said contact means past each said cathodic surfaces.

6. The source of electric power of claim 5 wherein: said elongated chain has a total length substaantially in excess of the total length of said path.

7. The source of electric power of claim 6 further comprising:
   a supply reel disposed at one end of said path and storing the excess length of said chain;
   a take-up reel disposed at the other end of said path receiving the leading end of said chain; and
   means for moving said chain from said storage reel through said path to be stored on said take-up reel to replenish the anodic material consumed by chemical reaction within said electrolyte from the excess length of said chain stored on said supply reel.

8. The source of electric power of claim 5 further comprising: wiper means disposed adjacent said path for contacting the surfaces of said bars to remove harmful deposits during movement of said chain past said wiper means.

9. The source of electric power of claim 8 wherein: said wiper means includes a plurality of separate wiper structures disposed at portions of said path between successive contact means for removing chemical reaction products deposits from opposing surfaces of said bars.

References Cited

UNITED STATES PATENTS

| | | | |
|---|---|---|---|
| 717,395 | 12/1902 | Halsey | 136—140 |
| 2,995,455 | 2/1960 | Eidensohn et al. | 136—86 |
| 3,260,620 | 7/1966 | Gruber | 136—86 |
| 3,281,283 | 10/1966 | Ralph | 136—176 |
| 3,293,080 | 12/1966 | Gruber et al. | 136—86 |
| 3,357,864 | 12/1967 | Huber | 136—113 |
| 3,432,354 | 3/1969 | Jost | 136—86 |
| 3,266,937 | 8/1966 | Lyons | 136—86 |

FOREIGN PATENTS 734  4/1854  Great Britain.

WINSTON A. DOUGLAS, Primary Examiner

A. SKAPARS, Assistant Examiner

U.S. Cl. X.R.

136—6, 140, 176

UNITED STATES PATENT OFFICE
CERTIFICATE OF CORRECTION

Patent No. 3,536,535                                    October 27, 1970

Richard L. Lippincott

It is certified that error appears in the above identified patent and that said Letters Patent are hereby corrected as shown below:

Column 1, line 51, "cathode" should read -- cathodes --. Column 3, line 52, after "battery 10" insert -- to --; line 74, "gases" should read -- gas --. Column 4, line 41, "for" should read -- form --. Column 5, line 74, "anoidc" should read -- anodic --. Column 6 line 15, "scrapping" should read -- scraping --. Column 8, line 56, after "each" and before "said" insert -- of --; line 58, "substaantially" should read -- substantially --.

Signed and sealed this 6th day of April 1971.

(SEAL)
Attest:

EDWARD M. FLETCHER, JR.                            WILLIAM E. SCHUYLER, JR.
Attesting Officer                                      Commissioner of Patents